United States Patent [19]
Dan et al.

[11] Patent Number: 5,453,779
[45] Date of Patent: Sep. 26, 1995

[54] SCHEDULING POLICIES WITH GROUPING FOR PROVIDING VCR CONTROL FUNCTIONS IN A VIDEO SERVER

[75] Inventors: Asit Dan, West Harrison; Nayyar P. Shahabuddin, White Plains; Dinkar Sitaram, Yorktown Heights, all of N.Y.

[73] Assignee: International Business Machines Corporation, Armonk, N.Y.

[21] Appl. No.: 213,758

[22] Filed: Mar. 15, 1994

[51] Int. Cl.[6] .................................................. H04N 7/173
[52] U.S. Cl. ................... 348/7; 348/13; 455/4.2
[58] Field of Search ............... 348/6, 7, 12, 13; 358/86; 455/4.2, 5.1, 6.1; H04N 7/16, 7/173

[56] References Cited

U.S. PATENT DOCUMENTS

| | | | |
|---|---|---|---|
| 4,569,026 | 2/1986 | Best | 364/521 |
| 4,630,108 | 12/1986 | Gomersall | 358/84 |
| 4,646,261 | 2/1987 | Ng | 364/900 |
| 4,724,491 | 2/1988 | Lambert | 358/310 |
| 4,746,994 | 5/1988 | Ettlinger | 360/13 |
| 4,761,691 | 8/1988 | Stearns | 358/311 |
| 4,816,904 | 3/1989 | McKenna et al. | 358/84 |
| 4,847,696 | 7/1989 | Matsumoto et al. | 358/335 |
| 4,947,244 | 8/1990 | Fenwick et al. | 358/86 |
| 4,949,187 | 8/1990 | Cohen | 348/10 |
| 4,977,455 | 12/1990 | Young | 358/142 |
| 5,003,384 | 3/1991 | Durden et al. | 358/84 |
| 5,019,905 | 5/1991 | Pshtissky et al. | 358/146 |
| 5,130,792 | 7/1992 | Tindell et al. | 348/13 |
| 5,168,353 | 12/1992 | Walker et al. | 358/86 |
| 5,172,413 | 12/1992 | Bradley et al. | 348/7 |
| 5,206,722 | 4/1993 | Kwan | 358/86 |
| 5,208,665 | 5/1993 | McCalley et al. | 358/86 |
| 5,245,429 | 9/1993 | Virginio et al. | 358/142 |
| 5,247,347 | 9/1993 | Litteral et al. | 358/85 |
| 5,339,315 | 8/1994 | Maeda et al. | 455/4.2 |
| 5,341,474 | 8/1994 | Gelman et al. | 348/7 |
| 5,357,276 | 10/1994 | Banker et al. | 348/12 |

OTHER PUBLICATIONS

Fleming, "ADSL: The On–Ramp to the Information Highway", Telephony Jul. 12, 1993 pp. 20, 24–26.

*Primary Examiner*—James J. Groody
*Assistant Examiner*—Chris Grant
*Attorney, Agent, or Firm*—Richard M. Ludwin

[57] ABSTRACT

An integrated scheduling approach that provides VCR control functions to clients without always requiring a separate video stream for all clients. When a client invokes a resume, following a pause, the system uses a hierarchy of methods to handle the request. If an ongoing video stream is available such that the point at which the client is paused will be reached by that stream within a tolerable delay, the client is assigned to the ongoing stream. If no such stream is available, and the client request can not be served from a buffer, the system assigns the client to a reserve stream taken from a pool of reserved server capacity. If no reserved server capacity is available, the client is given priority for assignment to the next stream to become available.

8 Claims, 7 Drawing Sheets

VIDEO-ON-DEMAND ENVIRONMENT

REQUEST DATA STRUCTURES

STREAM DATA STRUCTURES

SCHEDULING POLICIES WITH GROUPING FOR PROVIDING VCR CONTROL FUNCTIONS IN A VIDEO SERVER

I. BACKGROUND OF THE INVENTION a. Field of the Invention

The present invention relates to movie-on-demand systems of the type wherein multiple clients are serviced by video streams deliver from a central video server.

b. Related Art Look-ahead Scheduling to Support Video-on-Demand Applications

I. BACKGROUND OF THE INVENTION

1. Field of the Invention

The present invention relates to the support of on-demand pause-resume in a central video server.

2. Related Art

The feature of pause-resume is one of the most common operations in VCR. Recently, it has become increasingly popular to develop multimedia servers to support video-on-demand (VOD) applications. In a VOD environment, there are often hot videos which are requested by many viewers. The requirement that each viewer can independently pause the video at any instance and later resume the viewing has caused difficulties in batching of viewers on each showing.

In one conventional approach to support on-demand pause-resume, one video stream is provided for each viewer video request. For each multimedia server, there is a maximum number of video streams to the disks that can be supported. This upper limit will be referred to as $N_{MAX}$. Thus, the above-described approach can only support $N_{MAX}$ viewers.

In another conventional approach to the pause-resume problem, video streams are scheduled such that they become available at fairly close intervals. In response to receipt of a resume command from a viewer (after having received a pause) the server assigns to the viewer one of the video streams which is scheduled to become available in the near future. One problem with such a system is that the viewer must wait until the next video stream becomes available before the movie is resumed.

II. SUMMARY OF THE INVENTION

In light of the above, it is and object of the invention to provide efficient support for the pause-resume requirement.

An integrated scheduling approach that provides VCR control functions to clients without always requiring a separate video stream for all clients. When a client viewing a multicast stream (a common stream being shared by multiple viewers who have not paused) invokes a resume, following a pause, the system uses a hierarchy of methods to handle the request. If an ongoing video stream is available such that the point at which the client is paused will be reached by that stream within a tolerable delay, the client is assigned to the ongoing stream. If no such stream is available, the system assigns the client to a reserve stream taken from a pool of reserved server capacity. If no reserved server capacity is available, the client is given priority for assignment to the next stream to become available.

III. BRIEF DESCRIPTION OF THE DRAWINGS

IV. DETAILED DESCRIPTION OF THE PREFERRED EMBODIMENT

Figure 1:
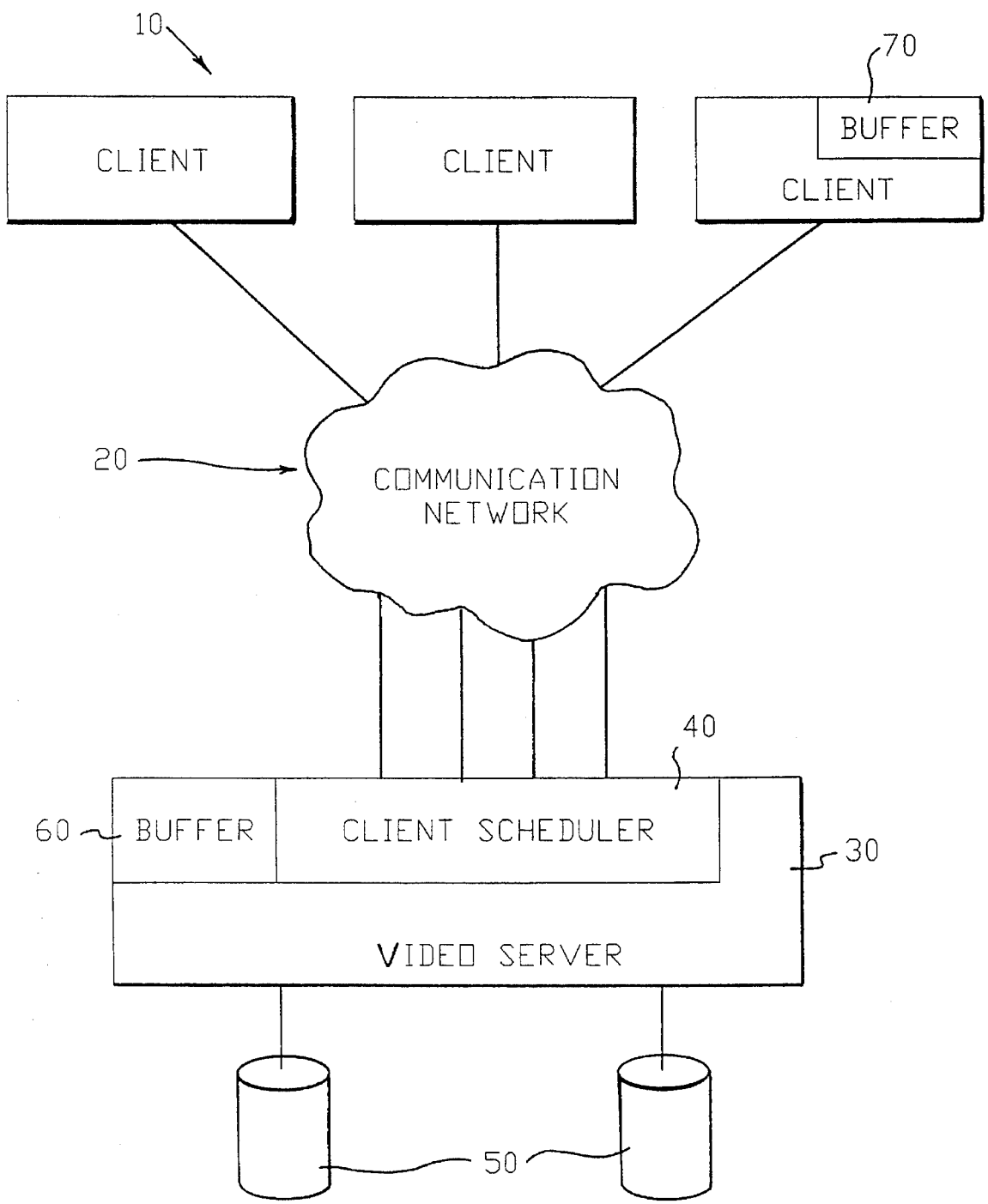
FIG. 1 is a block diagram of a video-on-demand system according to an embodiment of the present invention.

FIG. 1 is a block diagram of a video-on-demand system according to an embodiment of the present invention. In the following description, it is assumed that in a video-on-demand system clients 10 make requests from a server 30 via a communication network 20. The movies (videos) are stored on disks 50. The server and/or clients can have internal buffers 60, 70 for temporary storage of movies for handling short pause requests. The clients can make requests to start, stop, pause and resume a movie. The individual client requests are handled by a client scheduler 40. The client scheduler attempts to conserve server resources by combining requests for the same movie that are close together in time while allowing each client to individually pause and resume.

Figure 2:
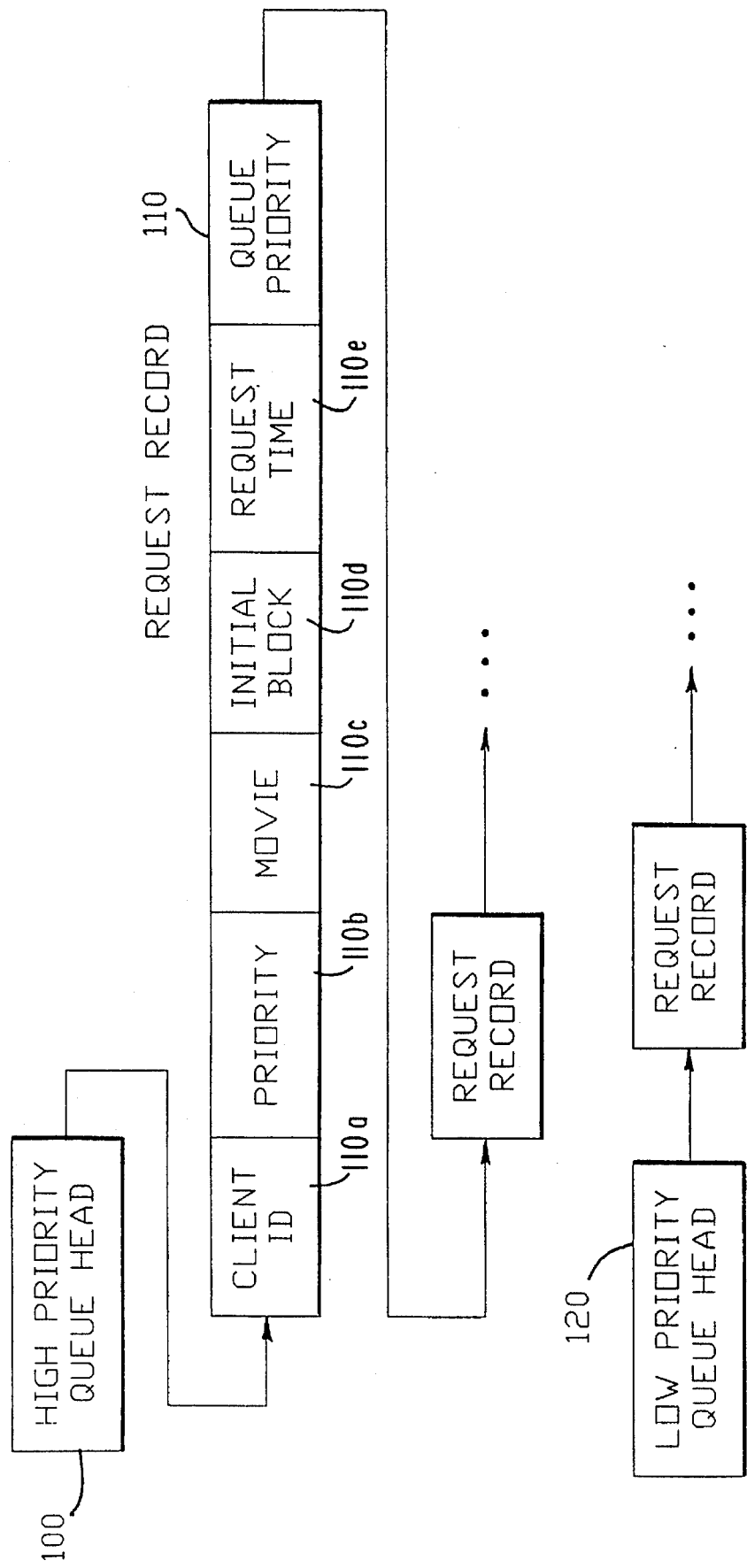
FIG. 2 shows the format of a request record.

A number of lists and tables are maintained by the client scheduler 40. Each client request to start or resume a movie results in a request record 110. The format of a request record is illustrated in FIG. 2.

The request record 110 contains the identifier of the client (Client ID) 110a, the request priority (Priority) 110b, the identifier of the requested movie (Req. Movie ID) 110c, the block number of the initial block requested (Initial Block) 110d and the time of the request (Request Time) 110e. The request priority 110b can be either high or normal. The request priority 110b is high if the request is for resuming a movie after a pause and normal if the request is for starting a movie.

The initial block 110c is the first block if the request is to start a movie and may be some other block if the request is for resume. All high priority requests are linked in a list off a high priority queue head 100 while all normal priority requests are linked off a low priority queue 120.

Figure 3:
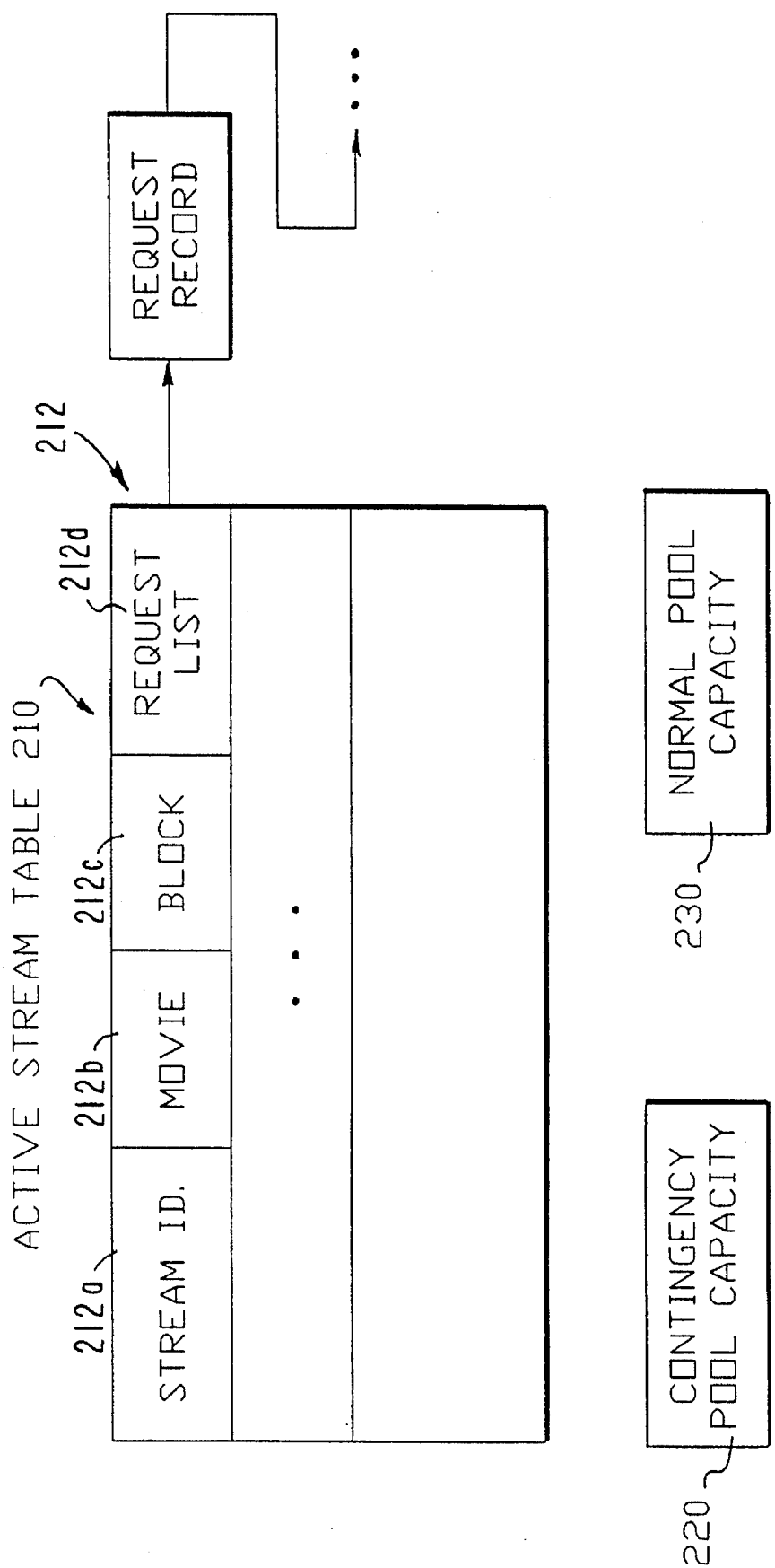
FIG. 3 shows the structure of the stream table of FIG. 1.

The client scheduler 40 also maintains a stream table 210 with an entry 212 for each active stream that is being played. The structure of the stream table is illustrated in FIG. 3. Each stream table entry 212 contains the stream identifier (Stream ID) 212a, the ID of the movie that is being shown (Current Movie ID) 212b and the block number current block in the movie that is being displayed (Current Block) 212c. The entry also contains a pointer (Request List) 212d to a linked list of client requests that are being satisfied by this stream.

Two counters 220, 230 are used to keep track of the current spare capacity of the server. A contingency pool counter 220 keeps track of the number of contingency streams available. A normal pool capacity counter 230 keeps track of the number of normal streams available. Contingency streams are used exclusively for handling resume requests while normal streams can be used to handle both resume and start requests.

Figure 4:
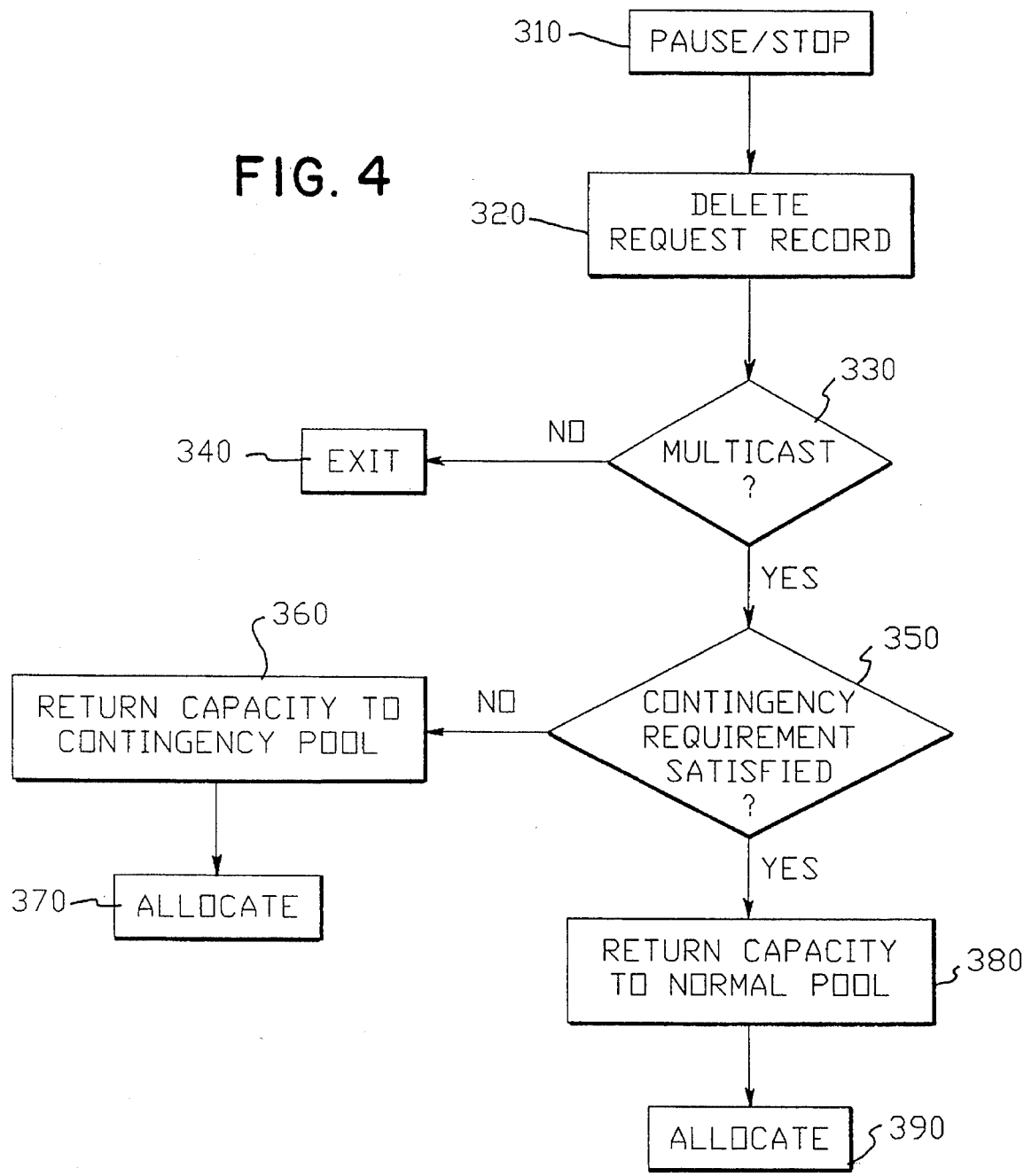
FIG. 4 is a flow chart of pause request handling by the client schedular of FIG. 1.

A flow chart of the handling of pause and stops requests by the client scheduler is shown in FIG. 4. When a pause request or a stop request is made by a client, it is received by the client scheduler 40 in step 310. In response, in step 320 the scheduler 40 deletes the request record for this client. Next, in step 330 the schedular checks to see if this stream is also being viewed by other clients. A stream that is also being viewed by other clients is sometimes referred to as a multicast stream, while a stream that is only being viewed by one client is sometimes referred to as a non-multicast stream. This is accomplished by finding the entry for this stream in the stream table 210 and examining the request list field 212*d*. If there are other clients viewing the stream, in step 340 the scheduler exits.

If there are no other clients viewing the stream, the stream can be returned either to the contingency pool or the normal pool. Thus, in step 350 the scheduler checks to see if there is sufficient capacity in the contingency pool. This is accomplished by checking if the contingency pool capacity 220 is greater than the required capacity. The required capacity is a function of the number of paused clients, the number of multicast clients and the number of multicast streams.

If there is insufficient capacity in the contingency pool 220, in step 360 the stream is returned to the contingency pool by incrementing the contingency pool capacity. Then, in step 370 the allocation task for handling queued requests is rerun. This is done because new server capacity has become available by virtue of returning the stream to the contingency pool 220.

If there is sufficient capacity in the contingency pool, in step 380 the stream is returned to the normal pool by incrementing the normal pool capacity 230. Then, in step 390 the allocation task is rerun.

Figure 5:
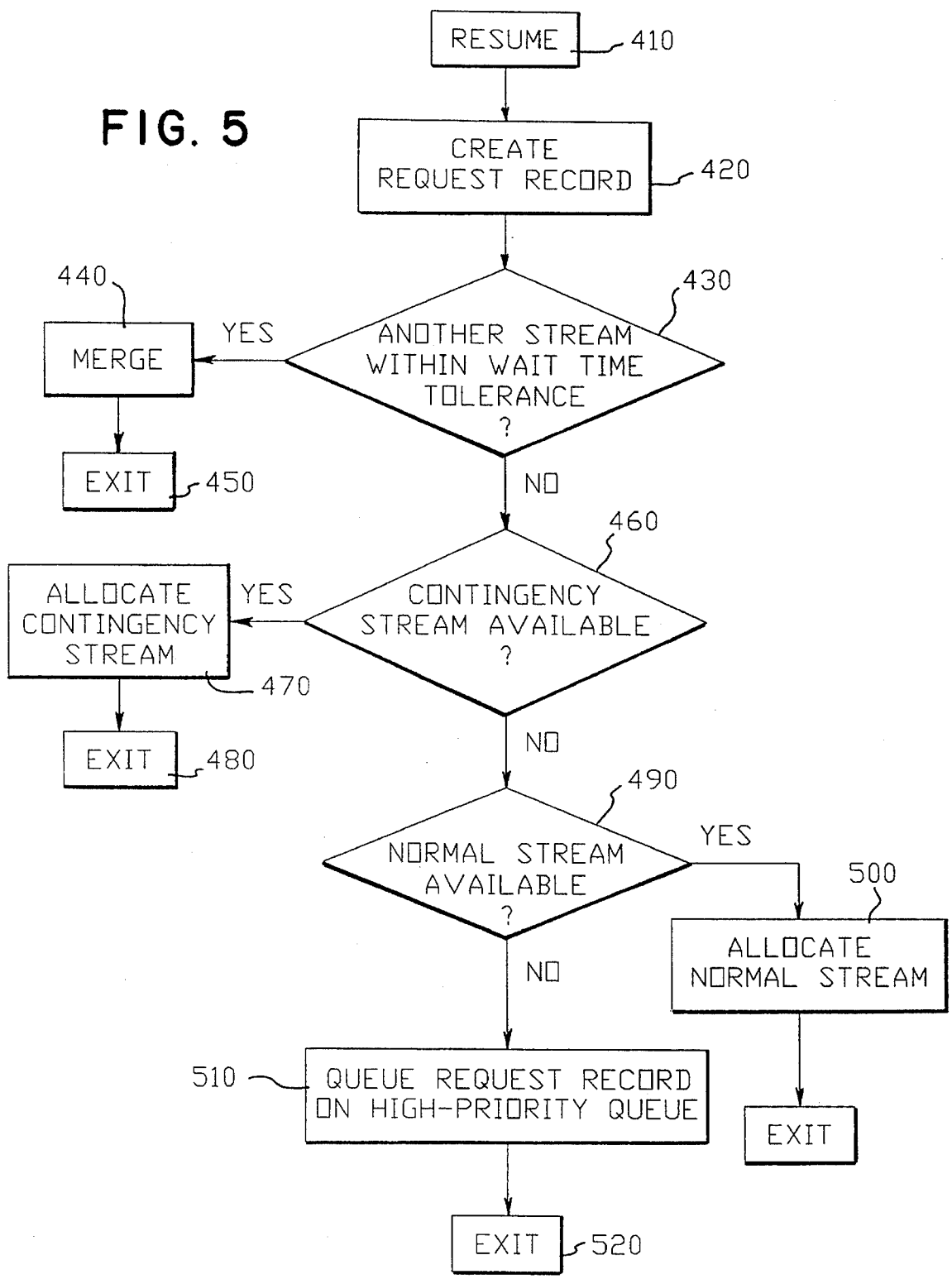
FIG. 5 is a flow chart of resume request handling by the client schedular of FIG. 1.

A flow chart of resume request handling by the client scheduler is shown in FIG. 5. When a resume request is made by a client, it is received by the client scheduler 40 in step 410. In response, in step 420 the scheduler 40 creates a request record for the request with the priority set to high and the initial block set to the requested block (in this case the block at which the movie is to be resumed).

Next, in step 430 the scheduler checks to see if the request can be satisfied by an already existing stream. This is accomplished by scanning the stream table 210 and comparing the block number in the stream entry with the initial block number in the request record. If the two block numbers are sufficiently close (for example less than a predefined threshold t, such as 30 seconds), in step 440 the scheduler adds the request record to the request list for the stream and uses the stream to satisfy the request. Then in step 450 the schedular exits. If, in step 440, it is determined that the two block numbers are not sufficiently close, in step 460 the scheduler determines if a contingency stream is available by checking the contingency pool capacity 220.

If a contingency stream is available, in step 470 the scheduler allocates a contingency stream for this request in by creating a stream entry (in the active stream table 210) for the new active stream, adding the request record to the request list 212*d* for this stream and decrementing the contingency pool capacity 220. The schedular then exits in step 480.

If in step 460 the scheduler determines that no contingency stream is available, in step 490 the scheduler determines if a normal stream is available by checking the normal pool capacity 230. If a normal stream is available, in step 500 the scheduler allocates a normal stream for this request by creating a stream entry (in the active stream table 210) for the new active stream, decrementing the normal pool capacity 230 and adding the request record to the request list 212*d* for the stream. If no normal stream is available, in step 510 the scheduler queues the request record off the high priority queue and then exits in step 520.

Figure 6:
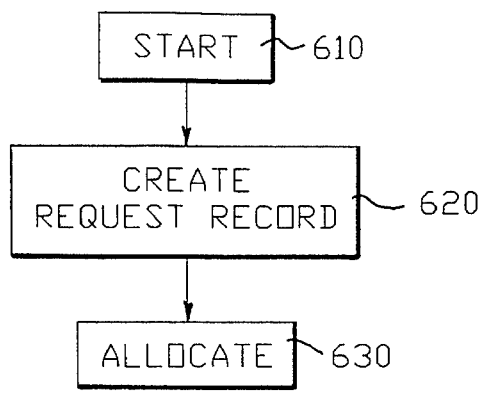
FIG. 6 is a flow chart of start request handling by the client schedular of FIG. 1.

A flow chart of start request handling by the client schedular is shown in FIG. 6. When a start request is made by a client, it is received by the client scheduler 40 in step 610. In response, in step 620 the scheduler creates a new request record 110 for the movie and queues this record off the normal priority queue 120. Then, the allocation task is run in step 630.

Figure 7:
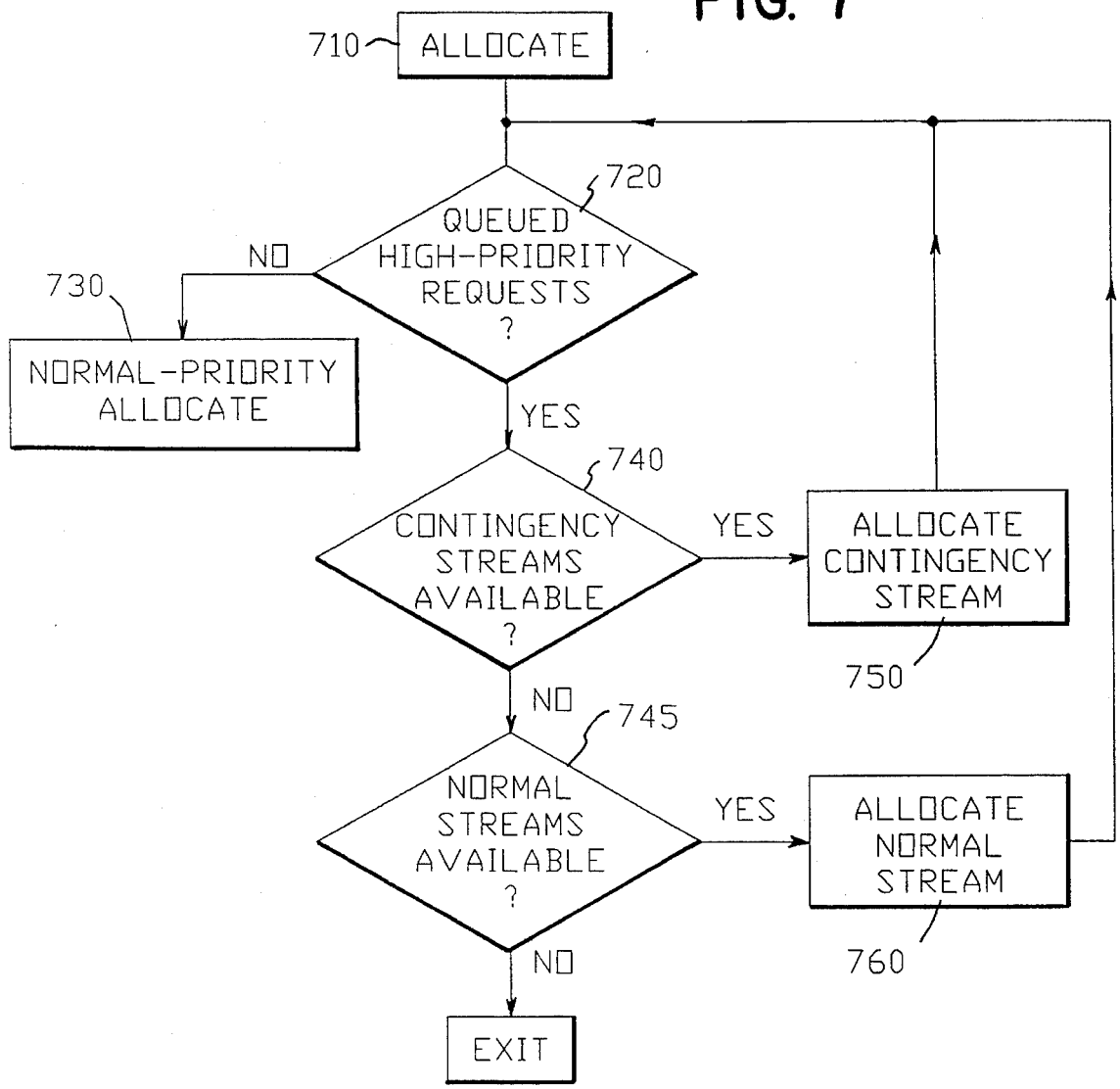
FIGS. 7 is a flow chart of the schedular's allocation task.
Figure 8:
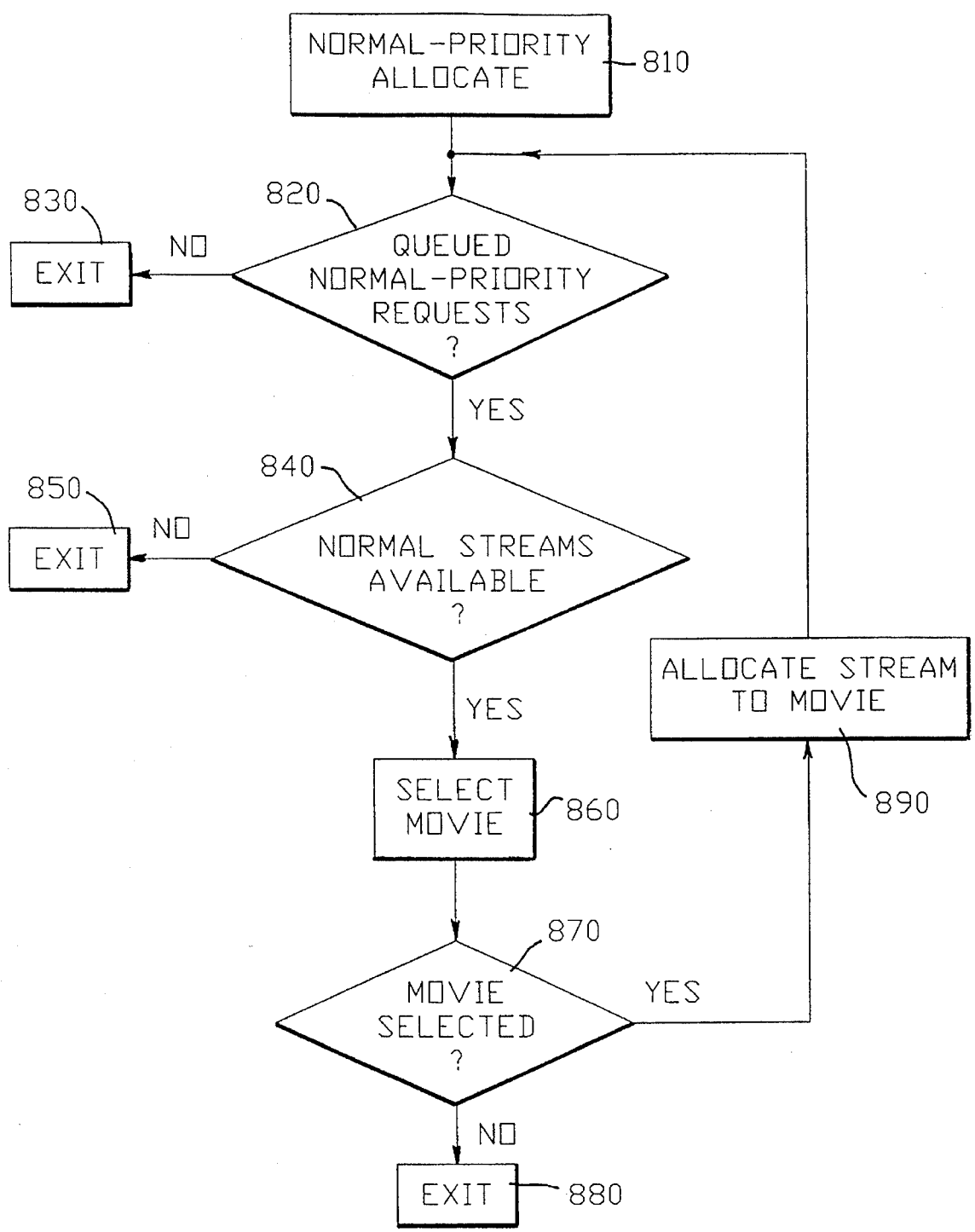
FIG. 8 is a flow chart of the normal priority allocation method of the allocation task.

A flow chart of the schedular's allocation task is shown in FIGS. 7 and 8. The allocation task is invoked in step 710 at various points (described above) by the scheduler 40. When the allocation task is invoked, in step 720 scheduler first checks to see if there are any queued high priority requests by examining the high priority queue block 100. If there are no high priority requests, in step 730 the scheduler invokes the normal priority allocation task of FIG. 8.

If there are high priority queued requests, in step 740 the scheduler determines if there are any contingency streams available. This is accomplished by examining the contingency pool capacity 220. If a contingency stream is available, in step 750 the scheduler satisfies the first high-priority request by allocating it a contingency stream.

In order to allocate a contingency stream, the scheduler creates a stream entry in the stream table 210 for a new stream, decrements the contingency pool capacity 220 and adds the request record to the request list for the new stream. The scheduler then repeats step 720.

If there are no contingency streams available, in step 745 the scheduler determines if there are any normal streams available by checking the normal pool capacity 230. If normal streams are available, in step 760 the scheduler allocates a normal stream by creating a new entry in the active stream table 210, decrementing the normal pool capacity 230 and adding the request record to the request list 212*d* for the new stream. The schedular then repeats step 720.

If, in step 745, the schedular determines that no normal streams are available, the scheduler exits in step 770.

The normal priority allocation task is shown in FIG. 8. The task is invoked in step 810 if there are no queued high priority requests. When the task is invoked, in block 820 the scheduler determines if there are any queued normal priority requests by examining the normal priority queue head 120. If there are no normal priority requests, the scheduler exits in step 830.

If there are queued requests, in step 840 the scheduler examines the normal pool capacity 230 to determine if there are any normal streams available. If there are no available streams, the scheduler exits in step 850. If there are available streams, the in step 860 scheduler executes the movie selection task.

The movie selection task examines the time of request field of the request records to determine how long each request has been waiting. The movie selection task uses these request waiting time to determine which movies (if any) to play. An example of a criteria which can be used by the movie selection task is to play all movies for which the earliest request has been waiting longer than a prespecified time (e.g. 3 minutes). In step 870, the scheduler checks to see if a movie has been selected for playing. If no movie was selected, the scheduler exits in step 880. If a movie was selected, all the requests for that movie can be satisfied. The scheduler allocates a stream for that movie in step 890 by creating an new entry in the active stream table 210, chaining all the request records for that movie off the request list 212d for the stream and decrementing the normal pool capacity 230. The scheduler then returns to step 820 to determine if there are any more queued normal priority requests.

The present invention can also work in conjunction with buffering. In such an embodiment, a memory buffer is provided at the video server for storing short portions of a video being multicast for a paused client who was viewing the multicast stream. If the client pauses for a sufficiently small period of time such that the portion of the movie being transmitted while the client was paused can be stored in the buffer, the client is served from the buffer when he resumes. If the client pauses for a longer period of time than can be stored in the buffer, the resume request is handled in accordance with the above-described hierarchical method.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of supporting pause-resume for a video-on-demand service of a type which can accommodate multiple clients sharing a common data stream, comprising the steps of:

receiving a performance request for showing a particular video;

concurrently transmitting the common data stream from a video server to reception equipment at the clients' locations, transmission of the data stream causing the particular video to be performed on the reception equipment;

receiving at the video server, a pause request and a subsequent resume request from one of the clients;

determining a point in the particular video at which the pause request was received by the video server;

in response to the resume request, determining whether another showing of the video, carried by a different data stream, is scheduled to reach the point at which the pause was received within a threshold time period;

when it is determined that the another showing will reach the point at which the pause was received within the threshold time period, assigning the one of the clients to the different data stream;

when it is determined that the another showing will not reach the point at which the pause was received within the threshold time period, determining whether a reserved data stream is available, and if so assigning the one of the clients to the reserved data stream and transmitting the video, from the point at which the pause was received, on the reserved data stream; and, when it is determined that a reserved data stream is not available, waiting for an ongoing data stream to end and scheduling the user to have priority for assignment to the ongoing data stream.

2. A method of supporting pause-resume for a video-on-demand service of a type which can accommodate multiple clients sharing a common data stream, comprising the steps of:

receiving a performance request for showing a particular video;

concurrently transmitting the common data stream from a video server to reception equipment at the clients' locations, transmission of the data stream causing the particular video to be performed on the reception equipment;

receiving at the video server, a pause request and a subsequent resume request from one of the clients;

determining a point in the particular video at which the pause request was received by the video server;

determining whether another showing of the video, carried by a different data stream, is scheduled to reach the point at which the pause was received within a threshold time period from receipt of the resume request;

when it is determined that the another showing will reach the point at which the pause was received within the threshold time period, assigning the one of the clients to the different data stream; and, when it is determined that the another showing will not reach the point at which the pause was received within the threshold time period, assigning the one of the clients to another stream capacity of the video server.

3. A method of supporting pause-resume for a video-on-demand service of a type which can accommodate multiple clients sharing a common data stream, comprising the steps of:

receiving a performance request for showing a particular video;

concurrently transmitting the common data stream from a video server to reception equipment at the clients' locations, transmission of the data stream causing the particular video to be performed on the reception equipment;

receiving at the video server, a pause request and a subsequent resume request from one of the clients;

in response to the pause request, storing the data stream to an allocated portion of a memory buffer; and, in response to the resume request:

determining whether the one of the clients can be served from the memory buffer and still view the video in continuity;

when the video can not be viewed from the memory buffer in continuity, determining whether another showing of the video, carried by a different data stream, is scheduled to reach the point at which the pause was received within a threshold time period from receipt of the resume request;

when it is determined that the another showing will reach the point at which the pause was received within the threshold time period, assigning the one of the clients to the different data stream;

when it is determined that the another showing will not reach the point at which the pause was received within the threshold time period, determining whether a reserved data stream is available, and if so assigning the one of the clients to the reserved data stream and transmitting the video, from the point at which the pause was received, on the reserved data stream; and, when it is determined that a reserved data stream is not available, waiting for an ongoing data stream to end and scheduling the one of the clients to have priority for assignment to the ongoing data stream.

4. A method of supporting pause-resume for a video on-demand service of a type which can accommodate multiple clients, comprising the steps of:

providing a contingency pool capacity comprising a number of streams set aside for handling resume requests;

providing a normal pool capacity comprising the remaining stream capacity of the video on demand service;

receiving a performance request for showing a particular video;

concurrently transmitting a multicast stream from a video server to reception equipment at a plurality of the clients' locations;

receiving at the video server, a pause request and a subsequent resume request from one of the clients;

determining a point in the particular video at which the pause request was received by the video server;

determining when the one of the clients was a viewer of a video data stream viewed only by one client (a non-multicast stream);

in response to a determination that the one of the clients was a viewer of the non-multicast stream, returning the stream capacity for the non-multicast stream to the contingency pool capacity when a number of the stream capacities in the contingency pool is below a threshold number and otherwise returning the stream capacity for the non-multicast stream to the normal pool capacity;

in response to the resume request from a viewer of a multicast stream, determining whether another showing of the video, carried by a different data stream, is scheduled to reach the point at which the pause was received within a threshold time period;

when it is determined that the another showing will reach the point at which the pause was received within the threshold time period, assigning the one of the clients to the different data stream;

when it is determined that the another showing will not reach the point at which the pause was received within the threshold time period, determining whether a reserved video stream is available from the contingency pool capacity, and if so assigning the one of the clients to the reserved data stream and transmitting the video, from the point at which the pause was received, on the reserved data stream;

when it is determined that a reserved data stream is not available, waiting for an ongoing data stream to end and scheduling the one of the clients to have priority for assignment to the ongoing data stream.

5. The method of claim 4 wherein the threshold number is computed as a function of the number of paused streams, the number of multicast streams and the number of multicast clients.

6. A method of supporting pause-resume for a video-on-demand service of a type which can accommodate multiple clients sharing a common data stream, comprising:

concurrently transmitting the common data stream from a video server to reception equipment at the clients' locations responsive to receipt of performance requests from the clients, transmission of the data stream causing a requested video to be performed on the reception equipment;

receiving a pause request and a subsequent resume request from one of the clients;

determining a point in the requested video at which the pause request was received by the video server;

buffering the common data stream responsive to the pause request;

responsive to the resume request, determining whether the one of the clients can be served from the buffer and still view the requested video in continuity;

when it is determined that the one of the clients can be served from the buffer and still view the requested video in continuity, assigning the client to receive the requested video from the buffer;

identifying another showing of the requested video, carried by a different data stream, which is scheduled to reach the point at which the pause was received within a threshold time period from receipt of the resume request; and when it is determined that the one of the clients can not be served from the buffer and still view the requested video in continuity, assigning the one of the clients to the different data stream.

7. The method of claim 6 wherein the different data stream is identified from a set of ongoing data streams not being currently transmitted to the client by the video-on-demand service.

8. A method of supporting pause-resume for a video-on-demand service of a type which can accommodate multiple clients sharing a common data stream, comprising the steps of:

concurrently transmitting the common data stream from a video server to reception equipment at the clients' locations responsive to receipt of performance requests from the clients, transmission of the data stream causing a requested video to be performed on the reception equipment;

receiving at the video server, a pause request and a subsequent resume request from one of the clients;

determining a point in the particular video at which the pause request was received by the video server;

determining, by examining the status of other ongoing data streams not being presently transmitted to the one of clients, whether another showing of the video, carried by a different data stream not being presently transmitted to the one of the clients, is scheduled to reach the point at which the pause was received within a threshold time period from receipt of the resume request;

when it is determined that the another showing will reach the point at which the pause was received within the threshold time period, assigning the one of the clients to the different data stream.

* * * * *